US012620916B2

(12) United States Patent
Suzuki et al.

(10) Patent No.: US 12,620,916 B2
(45) **Date of Patent: *May 5, 2026**

(54) TRANSPORT DEVICE

(71) Applicant: Hitachi High-Tech Corporation, Tokyo (JP)

(72) Inventors: Takahiro Suzuki, Tokyo (JP); Satoru Kaneko, Tokyo (JP); Shinji Azuma, Tokyo (JP); Takeshi Tamakoshi, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 122 days.

This patent is subject to a terminal disclaimer.

(21) Appl. No.: 18/696,153

(22) PCT Filed: Aug. 10, 2022

(86) PCT No.: PCT/JP2022/030600
§ 371 (c)(1),
(2) Date: Mar. 27, 2024

(87) PCT Pub. No.: WO2023/062926
PCT Pub. Date: Apr. 20, 2023

(65) Prior Publication Data
US 2024/0405699 A1 Dec. 5, 2024

(30) Foreign Application Priority Data
Oct. 13, 2021 (JP) ................................. 2021-168208

(51) Int. Cl.
*H01H 47/00* (2006.01)
*H01F 7/06* (2006.01)
*H02N 15/00* (2006.01)

(52) U.S. Cl.
CPC ............. *H02N 15/00* (2013.01); *H01F 7/064* (2013.01)

(58) Field of Classification Search
CPC ...................................................... H02N 15/00
See application file for complete search history.

(56) References Cited

U.S. PATENT DOCUMENTS

| | | | |
|---|---|---|---|
| 6,897,625 B2 | 5/2005 | Brixius et al. | |
| 11,851,282 B2 * | 12/2023 | Aoyama | H02P 6/185 |

(Continued)

FOREIGN PATENT DOCUMENTS

| | | |
|---|---|---|
| JP | 2014-532870 A | 12/2014 |
| JP | 2017-077971 A | 4/2017 |

(Continued)

OTHER PUBLICATIONS

English Translation of International Search Report issued in PCT Application No. PCT/JP2022/030600 dated Oct. 25, 2022.

(Continued)

*Primary Examiner* — Stephen W Jackson
(74) *Attorney, Agent, or Firm* — Foley & Lardner LLP

(57) ABSTRACT

To prevent liquid sloshing caused by switching a coil to be energized in a transport device. A transport device that transports an object to be transported provided with a magnetic body, the transport device includes: a plurality of coils configured to generate a thrust for transporting the object to be transported; a coil drive unit configured to apply a pulsed voltage to each of the plurality of coils; and a calculation unit. When switching a coil to be energized, the calculation unit determines a width of the pulsed voltage such that a speed or an acceleration of the object to be transported is stabilized based on a position of the object to be transported and a time at which the object to be transported passes through the position or a current flowing through an energized coil in a predetermined period before switching the coil to be energized, and outputs the determined width to the coil drive unit.

4 Claims, 7 Drawing Sheets

(56)          References Cited

U.S. PATENT DOCUMENTS

| | | | |
|---|---|---|---|
| 2001/0043450 A1* | 11/2001 | Seale ..................... | H02N 15/00 |
| | | | 361/160 |
| 2014/0234065 A1 | 8/2014 | Heise et al. | |
| 2021/0398723 A1 | 12/2021 | Aoyama et al. | |
| 2022/0144556 A1 | 5/2022 | Aoyama et al. | |
| 2022/0252628 A1 | 8/2022 | Tamakoshi et al. | |
| 2023/0184798 A1* | 6/2023 | Kaneko ................. | B65G 54/02 |
| | | | 422/67 |
| 2023/0211964 A1* | 7/2023 | Kobayashi ........... | H02P 25/064 |
| | | | 414/222.01 |

FOREIGN PATENT DOCUMENTS

| | | |
|---|---|---|
| JP | 2020-106354 A | 7/2020 |
| JP | 2020-142913 A | 9/2020 |
| JP | 2021-010254 A | 1/2021 |

OTHER PUBLICATIONS

International Preliminary Report on Patentability issued in PCT Application No. PCT/JP2022/030600 dated Feb. 7, 2023 with English Translation.
Extended European Search Report issued in corresponding EP Application No. 22879590.2 dated Aug. 21, 2025 (7 Pages).

* cited by examiner 0 (P1)                    P2                    P3          RELATIVE DISTANCE [mm]
                                                           FROM EXCITATION COIL 0 (P1)                    P2                    P3          RELATIVE DISTANCE [mm]
                                                           FROM EXCITATION COIL

TRANSPORT DEVICE

TECHNICAL FIELD

The present disclosure relates to a transport device.

BACKGROUND ART

With the advancement of medical care and aging of society, the importance of specimen processing in a clinical test is increasing.

A specimen processing device used in a clinical test tests a predetermined analysis item on a biological sample (a specimen) of a body fluid or the like such as blood, plasma, serum, and urine. The Specimen processing device can connect devices having a plurality of functions and automatically process each step. In other words, in order to rationalize work in a test room, analysis units in a plurality of analysis fields such as biochemistry and immunity are connected by a transport line and are operated as one device.

A transport line in the related art is mainly of a belt drive type. Therefore, when transport is stopped due to an abnormality occurring in the middle of the transport, a specimen cannot be supplied to a downstream device.

In order to improve a processing capacity of a specimen processing device, it is desired to transport specimens at high speed, transport a large number of specimens at the same time, and transport specimens in a plurality of directions.

PTL 1 discloses an electromagnetic actuator that is a container carrier including a magnetic active device such as a permanent magnet, that is arranged to be stationary below a transport plane adapted to carry a container adapted to carry a sample container, and that is adapted to move the container carrier on the transport plane by applying a magnetic force to the container carrier. Further, PTL 1 discloses that a speed of the container carrier that is moved on the transport plane is set by setting a time between contiguous activation of adjacent electromagnetic actuators.

PTL 2 discloses a transport device including a transport plane on which a transport container provided with a magnetic body is transported, a position detection unit that detects a position of the transport container on the transport plane, a magnetic pole that is disposed below the transport plane and includes a core and a coil, a drive unit that applies a voltage to the magnetic pole, and a calculation unit that controls the drive unit, in which the drive unit detects a current flowing through the magnetic pole, and the calculation unit detects a position of the transport container on the transport plane based on the detected current, calculates a transport speed of the transport container based on the position of the transport container on the transport plane and a time at which the transport container passes through the position, and detects a surface condition of the transport plane based on the calculated transport speed of the transport container. PTL 2 discloses that a current effective value, a current instantaneous value, a duty of the voltage pulse, and the like may be used when a permanent magnet is moved by a voltage pulse, and discloses a magnitude and a pulse width of the voltage pulse as a voltage waveform applied to a coil for detecting a position of the transport container.

CITATION LIST

Patent Literature

PTL 1: JP2017-77971A
PTL 2: JP2021-10254A

SUMMARY OF INVENTION

Technical Problem

In the electromagnetic actuator disclosed in PTL 1, the speed of the container carrier is adjusted according to the time during contiguous activation of the electromagnetic actuator.

The transport device disclosed in PTL 2 may use the duty of the voltage pulse or the like when the permanent magnet is moved.

In general, since coils are discretely arranged in a transport device, when a coil to be energized is switched, thrust pulsation occurs, and accordingly, liquid sloshing occurs. This phenomenon is structurally difficult to avoid.

PTL 1 and PTL 2 do not disclose a measure for preventing liquid sloshing, and it is considered that there is room for improvement.

An object of the present disclosure is to prevent liquid sloshing caused by switching a coil to be energized in a transport device.

Solution to Problem

A transport device according to the present disclosure transports an object to be transported provided with a magnetic body. The transport device includes: a plurality of coils configured to generate a thrust for transporting the object to be transported; a coil drive unit configured to apply a pulsed voltage to each of the plurality of coils; and a calculation unit. When switching a coil to be energized, the calculation unit determines a width of the pulsed voltage such that a speed or an acceleration of the object to be transported is stabilized based on a position of the object to be transported and a time at which the object to be transported passes through the position or a current flowing through an energized coil in a predetermined period before switching the coil to be energized, and outputs the determined width to the coil drive unit.

Advantageous Effects of Invention

According to the present disclosure, it is possible to prevent liquid sloshing caused by switching a coil to be energized in the transport device.

DESCRIPTION OF EMBODIMENTS

Figure 1:
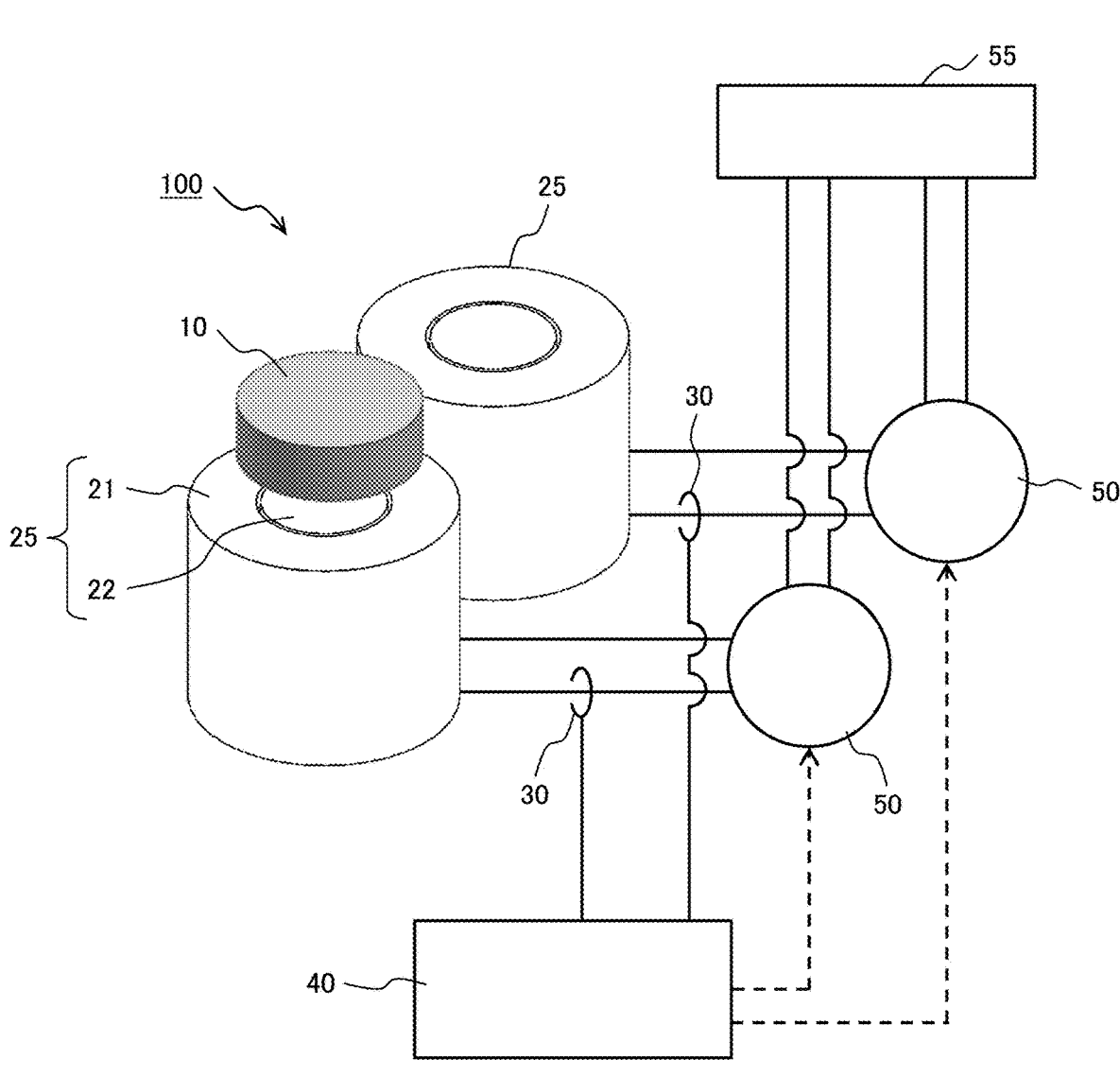
FIG. 1 is a schematic configuration diagram showing a transport device according to Embodiment 1.

The present disclosure relates to a specimen analysis system that analyzes a biological sample (hereinafter referred to as a "specimen") such as blood and urine, and a transport device suitable for a specimen preprocessing device that performs preprocessing necessary for an analysis.

Hereinafter, embodiments of the present disclosure will be described in detail with reference to the accompanying drawings. The same components are denoted by the same reference numerals, and the same description will not be repeated.

Various elements of the present disclosure do not necessarily have to be individually independent of one another, and it is allowed that a plurality of elements are formed as one member, one element is formed of a plurality of members, an element is a part of another element, a part of an element overlaps a part of another element, and the like.

Embodiment 1

<Schematic Configuration of Transport Device>

FIG. 1 is a schematic configuration diagram showing a transport device according to Embodiment 1.

In the drawing, a transport device 100 includes a permanent magnet 10, two coils 25, coil drive units 50 (drive circuits), a power supply 55, current detection units 30, and a calculation unit 40.

The permanent magnet 10 is provided in a specimen folder or the like which is an object to be transported. Each of the coils 25 includes a cylindrical core 22 and a winding wire 21 provided on an outer peripheral side of the core 22. Although two coils 25 are shown in the drawing, two or more coils 25 are usually provided.

The coil drive units 50 are connected to the coils 25, respectively. Each of the current detection units 30 detects a current flowing from each coil drive unit 50 to the winding wire 21 of each coil 25.

A propulsive force is generated in the permanent magnet 10 by an interaction with the coil 25. An object to be transported such as a specimen folder provided with the permanent magnet 10 is moved when the object to be transported receives the propulsive force. Accordingly, a specimen container or the like (not shown) installed in the specimen folder is transported. A speed, a movement direction, a destination, and the like of the object to be transported are adjusted by controlling a current flowing through the coil 25.

In general, a transport surface (not shown) for supporting the permanent magnet 10 is provided between the coil 25 and the permanent magnet 10. A plurality of the coils 25 may be provided in a row below the transport surface. In this case, the transport surface may be a surface on which the object to be transported is moved along a linear or curved path. When the transport surface is an xy plane, a plurality of coils 25 may be provided below the xy plane in a row in each of an x axis direction and a y axis direction. The permanent magnet 10 is moved in a manner of sliding on the transport surface. A container to be transported is not limited to the specimen container, and may be a reagent container or the like. Therefore, the container to be transported may be referred to as a "transport container". In addition, the object to be transported includes a small transportable device.

The transport device 100 moves the object to be transported between the coils 25 by applying a current to the winding wire 21 and applying an electromagnetic force to the permanent magnet 10. In order to efficiently apply the electromagnetic force and move the object to be transported in a desired direction, relative positional information between the permanent magnet 10 and the coil 25 is required.

For example, when the permanent magnet 10 is located directly above one of the two coils 25, no force in a transport direction is generated even when a current flows through the coil 25 directly below the permanent magnet 10. On the other hand, when a current flows through the coil 25 adjacent to the coil 25 directly below the permanent magnet 10, a force for attracting the permanent magnet 10 to the adjacent coil 25 can be generated. That is, the force can be efficiently generated and a direction of the force can be controlled.

By adopting a configuration in which three or more coils 25 are arranged side by side and sequentially switching the coils 25 to be energized (energizing coils), it is possible to freely move the object to be transported provided with the permanent magnet 10.

Although the permanent magnet 10 is used in the above description, another magnet or soft magnetic body may be used instead of the permanent magnet 10. Instead of the permanent magnet 10, a combination of the permanent magnet 10 and a soft magnetic body may be provided.

<Thrust Characteristics>

Figure 2:
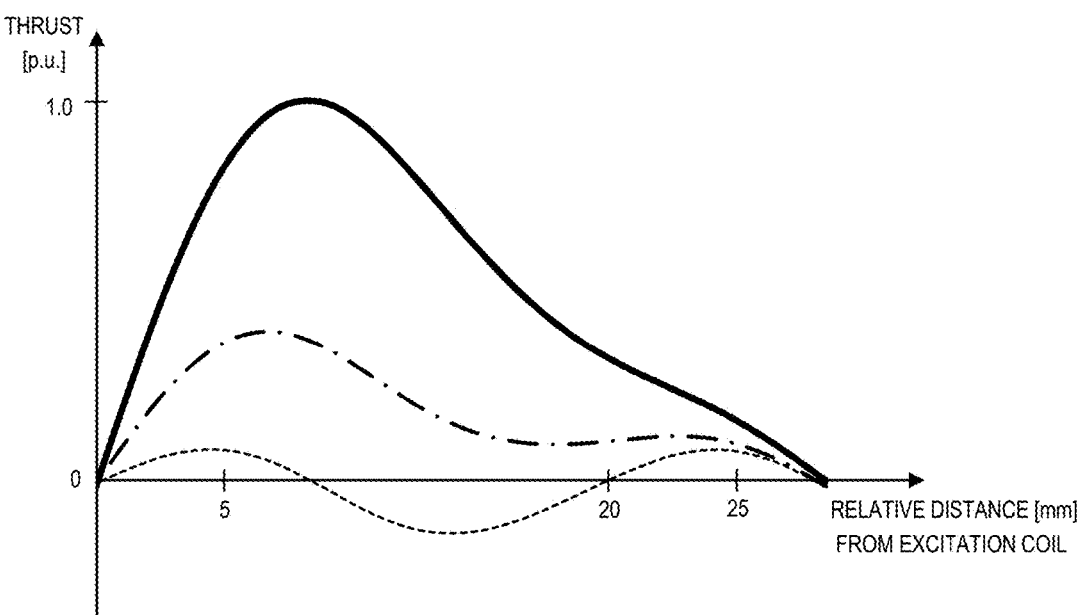
FIG. 2 is a graph showing a thrust acting on a permanent magnet relative to a distance between a coil and the permanent magnet.

FIG. 2 is a graph showing a thrust acting on the permanent magnet relative to a distance between the coil 25 and the permanent magnet 10. A horizontal axis represents a distance between the permanent magnet 10 and the coil 25 (an excitation coil), and a vertical axis represents a thrust acting on the permanent magnet. A dotted line indicates a case where no current flows through the coil 25, a dot-dashed line indicates a case where the current is relatively small, and a solid line indicates a case where the current is relatively large.

As described above, in the configuration shown in FIG. 1, the transport surface (not shown) is provided between the coil 25 and the permanent magnet 10. Therefore, when a current flows through the coil 25, forces are generated in a vertical direction and a horizontal direction. FIG. 2 shows a force acting in the horizontal direction, that is, a force for moving the permanent magnet on the transport surface. As a matter of course, a frictional force is generated when the permanent magnet is moved on the transport surface, and thus the frictional force needs to be considered, but description of the frictional force is omitted here for simplicity.

Thrust characteristics shown in FIG. 2 vary depending on a shape (a diameter and a length) of the cylindrical core 22, a shape (a diameter and a thickness) of the permanent magnet 10, characteristics of a magnetic circuit such as specifications (linear and the number of turns) of the winding wire 21, a current flowing through the winding wire 21, and the like, and the thrust characteristics can be detected in the present description.

As can be seen from FIG. 2, in a state where a constant current flows, a thrust acting on the permanent magnet 10 has position dependency. That is, a speed fluctuation occurs when a specimen container (an object to be transported) provided with the permanent magnet 10 is transported. When the speed fluctuation occurs, a specimen may be spilled or stirred due to sloshing of a liquid in the specimen container.

When the coil 25 to be energized is switched, a distance of the permanent magnet 10 from the coil 25 is suddenly changed. For example, when the coils 25 are arranged in a grid pattern at equal pitches of 20 mm and the coils arranged in a linear shape are sequentially energized, the specimen container provided with the permanent magnet 10 is moved along a linear transport path in which the coils 25 are arranged. When the adjacent coil 25 arranged in a moving direction of the specimen container is excited at a timing at which a relative distance from the coil 25 becomes 5 mm, the distance from the coil 25 becomes 25 mm. Therefore, when control is performed such that currents of the same value flow through the coils 25, that is, when voltages of the same value are applied to the coils 25, a thrust applied to the specimen container provided with the permanent magnet 10 greatly changes.

<Overall Configuration of Calculation Unit>

Figure 3:
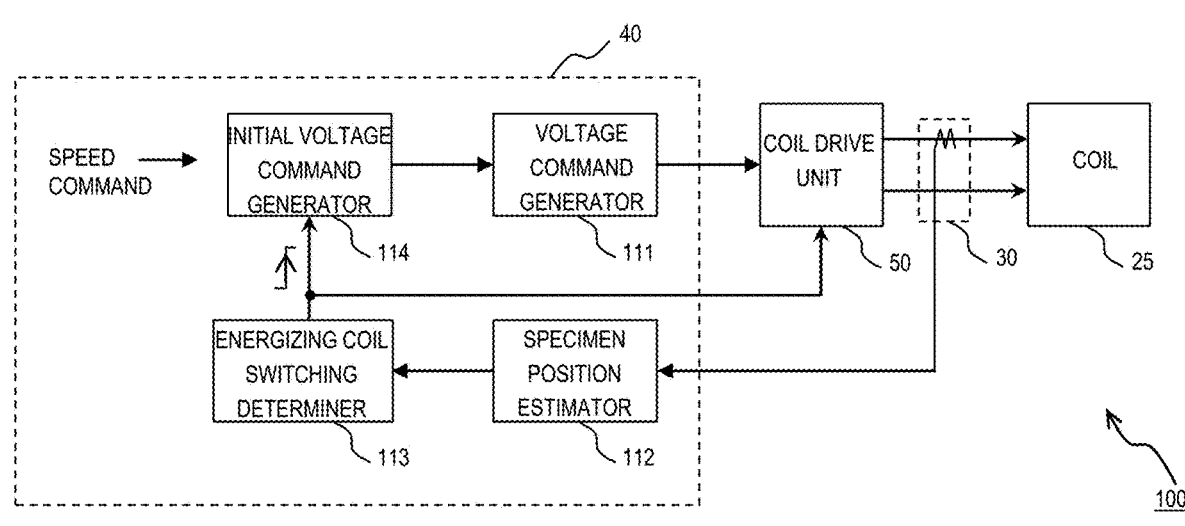
FIG. 3 is a functional block diagram showing a configuration of the transport device according to Embodiment 1.

FIG. 3 is a functional block diagram showing a configuration of the transport device according to Embodiment 1.

In the drawing, the calculation unit 40 of the transport device 100 includes a voltage command generator 111, a specimen position estimator 112 (a position estimation unit), an energizing coil switching determiner 113, and an initial voltage command generator 114.

The calculation unit 40 estimates a position of a specimen and determines to switch an energizing coil based on a current flowing through the coil 25, and outputs a voltage command value to the coil drive unit 50. The coil drive unit 50 applies a voltage to the coil 25 to be energized according to a command of the calculation unit 40.

Hereinafter, each block will be described.

<Coil Drive Unit>

The coil drive unit 50 is implemented by, for example, a voltage inverter driven by a general PWM signal. The current detection unit 30 is implemented by a shunt resistor, a current transformer (CT), and the like. Here, PWM is an abbreviation for pulse width modulation.

A voltage command value generated by the voltage command generator 111 to be described later is compared with a carrier transport wave of a triangle wave or a sawtooth wave, and an on and off time ratio (a duty) of a switching element of an inverter is controlled to control a voltage to be applied to a coil. Here, the duty refers to an on time of the switching element. For example, the duty of 70% refers to that the switching element is turned on for a period of 70% of one cycle of the carrier transport wave. That is, as the duty increases, a width of an output voltage pulse increases. This is equivalent to an increase in an output voltage.

For example, a general full bridge circuit (an H-bridge circuit) including four switching elements can be used as the coil drive unit 50. The coil drive unit 50 may include a plurality of full bridge circuits the number of which is the same as the number of the coils 25, or may be configured to appropriately switch a connection between the coils and the full bridge circuits in a configuration in which the number of the full bridge circuits is smaller than the number of the coils

25. A coil to be energized is switched according to either a signal from an upper controller (not shown) or a trigger signal of the energizing coil switching determiner 113 to be described later.

As can be seen from the thrust characteristics shown in FIG. 2, since an electromagnetic force (a thrust) acting on the permanent magnet 10 depends on a current flowing through the coil 25, it is necessary to control the current in order to control the thrust.

In the present embodiment, since the coil drive unit 50 is implemented by a voltage type full bridge circuit, the current flowing through the coil 25 is controlled by adjusting an output voltage of the coil drive unit 50, and as a result, the thrust is controlled.

<Necessity of Position Information>

As described above, in the transport device 100, the electromagnetic force is generated in the permanent magnet 10 by causing a current to flow through the winding wire 21, and the permanent magnet 10 is moved on the transport surface. In order to efficiently apply the electromagnetic force (the thrust) to the permanent magnet 10 to move the permanent magnet 10 in a target direction or to smoothly move the permanent magnet 10 at a predetermined speed, relative positional information between the permanent magnet 10 and the coil 25 is required.

As can be seen from the thrust characteristics shown in FIG. 2, when the permanent magnet 10 is directly above the coil 25, that is, when a distance between the permanent magnet 10 and the coil 25 (an excitation coil) is zero in FIG. 2, even when a current flows through the coil 25, a force for moving the permanent magnet 10 on the transport surface is not generated.

When the permanent magnet 10 is not positioned directly above the coil 25 but away from the coil 25 in the horizontal direction, a thrust can be generated in the permanent magnet 10 by causing a current to flow through the coil 25. Depending on a direction of the current, that is, a direction of a magnetic flux generated by the coil 25, it is possible to control a force (an attractive force) for attracting the permanent magnet 10 and a force (a repulsive force) for separating the permanent magnet 10. Further, the thrust can be controlled according to a current value.

<Principle of Position Estimation>

The core 22 is made of a magnetic material. A magnetic flux passing through the core 22 has a property that it is difficult to pass through the core 22 as the magnetic flux increases. Here, when a voltage is applied to the winding wire 21 to cause a current to flow through the winding wire 21, a magnetic flux generated by the current is generated in the core 22. Therefore, a magnetic flux generated by the permanent magnet 10 and a magnetic flux generated by the current flowing through the winding wire 21 are generated in the core 22.

A magnetic flux generated when a current flows through the winding wire 21 is proportional to a value of the current. A proportional constant in this case is called inductance. The inductance changes depending on a saturation state of a magnetic circuit having a magnetic body such as the core 22, that is, saturation characteristics of the core 22.

When saturation of the core 22 occurs, the inductance changes depending on a magnitude of a magnetic flux generated in the core 22. That is, the inductance of the winding wire 21 changes depending on a magnitude of the magnetic flux of the permanent magnet 10. This refers to that the inductance of the winding wire 21 changes depending on a position of the permanent magnet 10.

7

8

Figure 4:
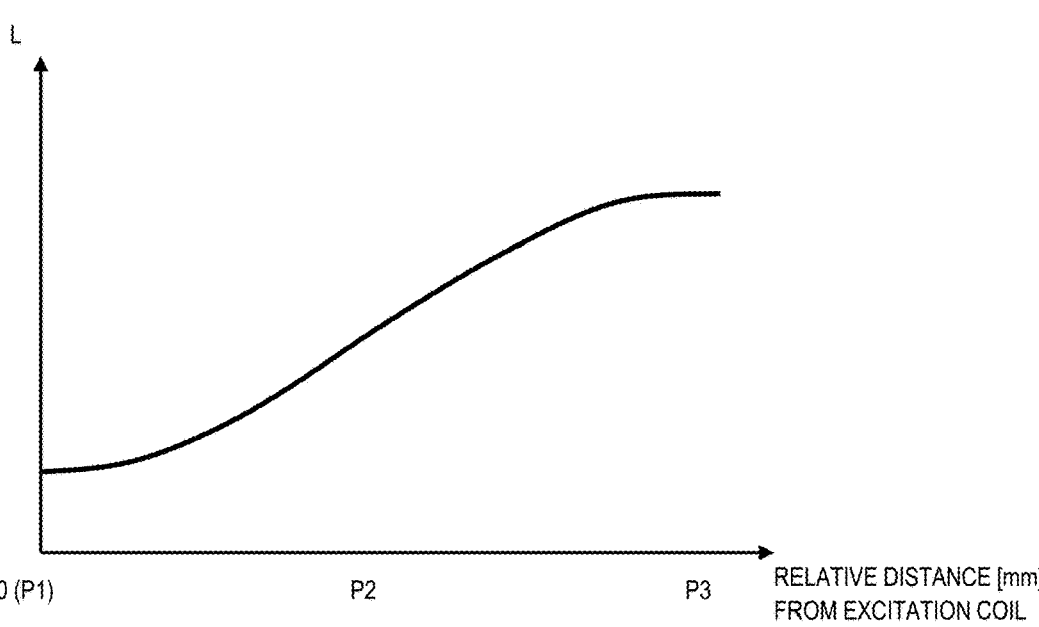
FIG. 4 is a graph showing an example of positional characteristics of inductance of a coil.

FIG. 4 is a graph showing an example of positional characteristics of inductance of the coil 25. A horizontal axis represents a distance between the permanent magnet 10 and the coil 25, and a vertical axis represents inductance L of the coil 25.

In the drawing, the inductance L is an increasing function relative to the distance.

A voltage V generated in the winding wire 21 is expressed by the following formula (1).

$$V = -d\varphi/dt \qquad (1)$$

In this Formula, φ is a magnetic flux, and t is a time.

When a current is I and the inductance is L, the following relational Formula (2) is established.

$$dI/dt = (1/L) \times (d\varphi/dt) \qquad (2)$$

The following relational formula (3) is obtained from the above formulas (1) and (2).

$$dI/dt = -V/L \qquad (3)$$

That is, when a constant voltage is applied to the winding wire 21, a time differentiation of the supplied current I changes depending on a magnitude of the inductance L as shown in the above formula (3). This refers to that when a voltage is applied, the way a supplied current rises is different. That is, when the inductance L of the winding wire 21 that changes depending on a position of the permanent magnet 10 is detected, the position of the permanent magnet 10 that affects the inductance L is obtained.

<Specimen Position Estimator 112>

Figure 5:
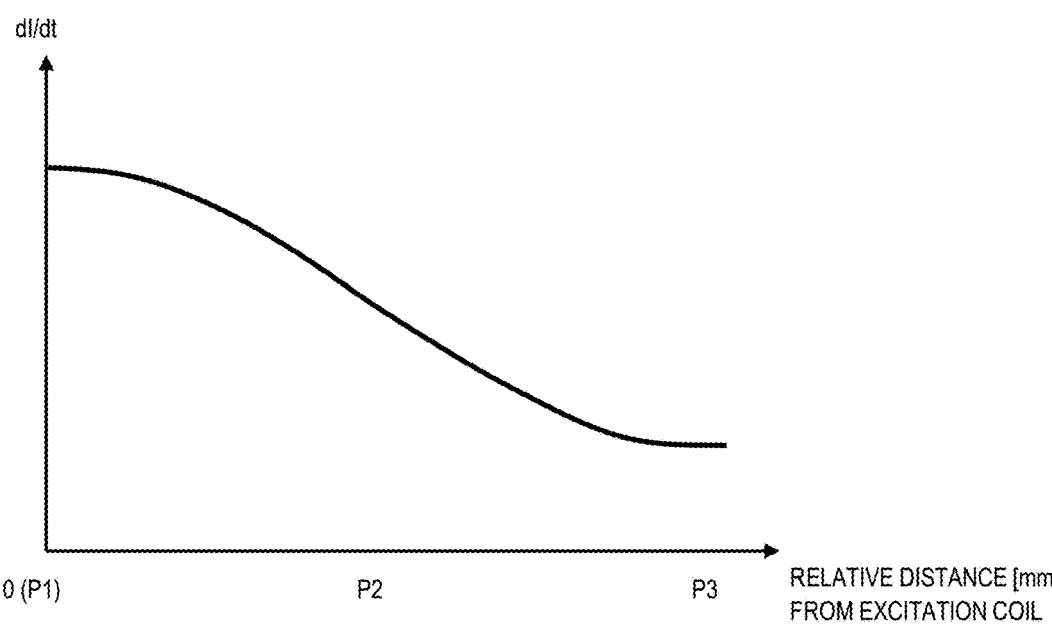
FIG. 5 is a graph showing an example of positional characteristics of a time change rate of a current flowing through the coil.

FIG. 5 is a graph showing an example of positional characteristics of a time change rate of a current flowing through the coil 25. A horizontal axis represents a distance between the permanent magnet 10 and the coil 25, and a vertical axis represents a time change rate dI/dt of the current flowing through the coil 25.

In the drawing, dI/dt is a decreasing function relative to the distance.

The positional characteristics of dI/dt as shown in the drawing are acquired in advance, and are, for example, stored in the specimen position estimator 112 (FIG. 3) as table data. In the specimen position estimator 112, dI/dt is obtained based on a current detected by the current detection unit 30, dI/dt is input to the specimen position estimator 112, and a position of a specimen container provided with the permanent magnet 10 is estimated by referring to the table data.

In summary, the specimen position estimator 112 has data of the time change rate of a current or the inductance of a coil on the transport surface, which is determined by a positional relationship between a magnetic body and the coil, and estimates a position of an object to be transported using a measured value of the current flowing through the coil.

<Energizing Coil Switching Determiner 113>

Figure 6:
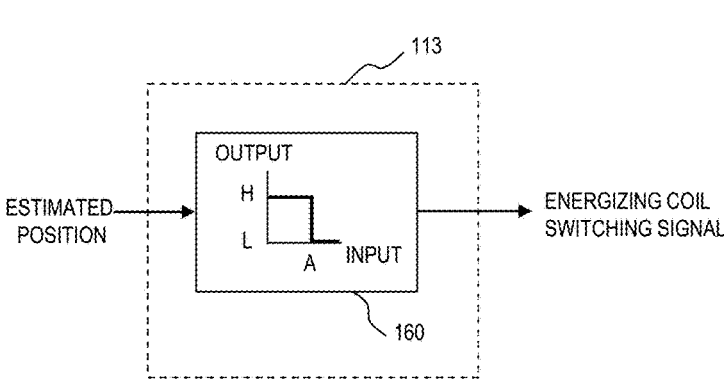
FIG. 6 is a configuration diagram showing an example of an energizing coil switching determiner shown in FIG. 3.

FIG. 6 is a configuration diagram showing an example of the energizing coil switching determiner shown in FIG. 3.

In FIG. 6, the energizing coil switching determiner 113 includes an estimated position comparator 160. In the estimated position comparator 160, a reference for determining an output for an input is set as in a graph schematically shown in the drawing. In the graph, when an input value is A or more, an output value is Lo (for example, 0), and when the input value is less than A, the output value is Hi (for example, 1).

The estimated position comparator 160 set as described above is operated as follows.

An estimated position by the specimen position estimator 112 is input to the estimated position comparator 160. The estimated position comparator 160 compares the estimated position (an input value) with a preset value or a determined value given from an upper controller or the like (not shown) to output a signal of Hi or Lo (an energizing coil switching signal). That is, when a specimen container provided with the permanent magnet 10 is attracted to the energizing coil and approaches a determined position (A in the example shown in FIG. 6), Hi (for example, 1) is output.

<Meaning and Importance of Initial Voltage>

Figure 7:
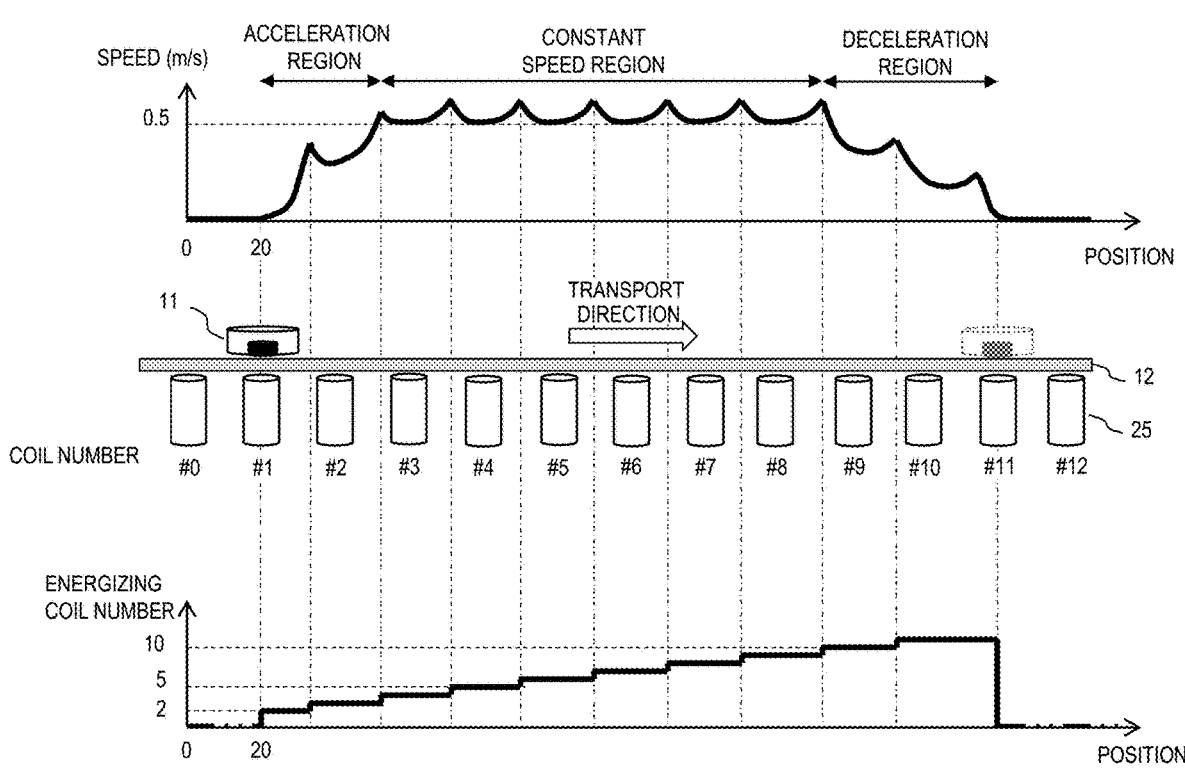
FIG. 7 is a graph showing a position of a coil that applies a thrust to a transported specimen folder due to energization and a speed of the specimen folder.

FIG. 7 is a graph showing a position of a coil that applies a thrust to a transported specimen folder due to energization and a speed of the specimen folder.

A specimen folder 11 is shown in the drawing, and the specimen folder 11 is moved above one axis of the coils 25 arranged in a grid pattern in the x axis direction and the y axis direction below the xy plane which is the transport surface, for example, above a row of coils arranged linearly in the x axis direction. The specimen folder 11 is provided with a permanent magnet.

In a lower graph in the drawing, a horizontal axis represents a position (a relative distance) based on a coil number #0, and a vertical axis represents a number of an energizing coil. On the other hand, in an upper graph, a horizontal axis is the same as the horizontal axis in the lower graph, and a vertical axis represents a speed of the specimen folder. Here, an example is shown in which 13 coils 25 are linearly arranged every 20 mm.

An arrangement of the specimen folder 11, a transport surface 12, and the coils 25 is schematically shown in the middle of the drawing. The 13 coils 25 shown in the middle of the drawing are assigned with coil numbers #0 to #12.

As shown in the lower graph, the specimen folder 11 is moved from a left side to a right side in the drawing by sequentially energizing the energizing coils indicated by the numbers.

Specifically, an example is shown in which the specimen folder 11 is moved at a set speed of 0.5 m/s from the number #1 to the coil number #11. More specifically, coils of the coil numbers #1, #2, and #3 are sequentially energized to accelerate the specimen folder 11 to the set speed of 0.5 m/s. Thereafter, a voltage applied to the coils is adjusted so as to move the specimen folder 11 at a constant speed during a period in which coils of the coil numbers #4 to #9 are energized (a constant speed region). Then, coils of the coil numbers #10 and #11 are energized to decelerate and stop the specimen folder 11.

As shown in FIG. 2, a magnetic force acting on the specimen folder 11 changes depending on a distance between the permanent magnet 10 and the coil 25 and the current flowing through the coil 25. Furthermore, even when the magnetic force acting on the specimen folder 11 is constant, a moving speed of the specimen folder 11 is not necessarily constant due to a mass of a specimen container placed in the specimen folder 11, an amount (a mass) of specimens, a friction coefficient of the transport surface 12, and the like. In particular, when the coil 25 to be energized is switched, the magnetic force acting on the specimen folder 11 tends to be discontinuous.

When the coil drive unit 50 performs PWM control, a pulsed voltage is applied, and an effective value of the voltage is controlled by a duty ratio. Therefore, there is a period in which a voltage output from the coil drive unit 50 is zero. That is, the current flowing through the coil 25 includes a ripple component. Therefore, a speed fluctuation actually occurs even in the constant speed region.

Further, the friction coefficient of the transport surface 12 changes depending on aging deterioration, dirt and dust on the transport surface 12, and temperature and humidity. Therefore, it is necessary to control a thrust by detecting a speed of the specimen folder 11 that changes from moment to moment.

When the speed of the specimen folder 11 is controlled by sequentially switching energizing coils, in order to prevent pulsation of a thrust structurally generated, it is important not only to control a current supplied to the coil 25 but also to appropriately control a current at the time of switching the coil 25 to be energized. The current at the time of switching the coil 25 to be energized is controlled according to an initial voltage immediately after switching the coil 25 to be energized and a voltage at an initial stage of a period in which the specific coil 25 is energized.

The initial voltage refers to a voltage output by the coil drive unit 50 immediately after the coil 25 to be energized is switched and at an initial stage of a period in which the specific coil 25 is energized (for example, a period of 30% of a first half of an energization period).

<Initial Voltage Command Generator 114>

Figure 8:
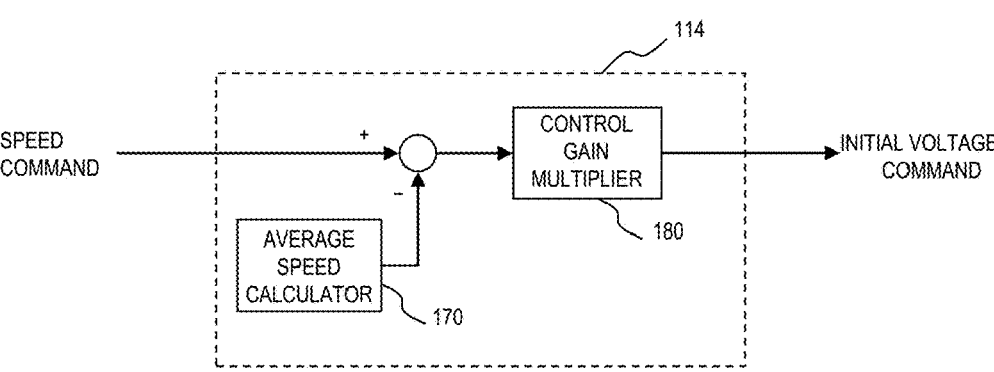
FIG. 8 is a block diagram showing an example of an initial voltage command generator shown in FIG. 3.

FIG. 8 is a configuration diagram showing an example of the initial voltage command generator shown in FIG. 3.

In FIG. 8, the initial voltage command generator 114 includes an average speed calculator 170 (an average speed calculation unit) and a control gain multiplier 180.

The average speed calculator 170 calculates an average speed. A difference between the calculated average speed and a speed command value from an upper controller (not shown), that is, an error is obtained.

The control gain multiplier 180 generates an initial voltage command using the obtained error. A plurality of configurations may be considered as the control gain multiplier 180, and for example, a proportional integral controller (a PI controller) and an integral controller (an I controller) can be applied.

For example, when the specimen folder 11 is heavy or when the friction coefficient of the transport surface is high, a transport speed is low even when control is performed such that a predetermined thrust acts on the specimen folder 11. In this case, the difference between the speed command value and the average speed is positive, and by amplification by the control gain multiplier 180, a voltage applied to the coil 25 is increased in order to increase an insufficient speed. As described above, when the coil drive unit 50 is driven by a PWM signal, a duty ratio increases.

Any configuration example other than the example shown in the drawing can be applied as the initial voltage command generator 114.

In the drawing, the initial voltage command is generated based on data of an average speed before an energizing coil is switched.

Next, a method of calculating the average speed in the average speed calculator 170 will be described.

Figure 9:
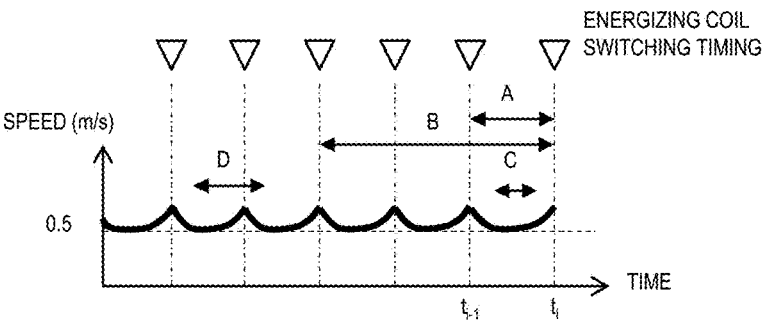
FIG. 9 is a graph showing changes over time in a speed of the transported specimen folder.

FIG. 9 is a graph showing changes over time in a speed of a transported specimen folder. A horizontal axis represents a time and a vertical axis represents a speed. In the drawing, a downward triangular shape indicates a timing of switching an energizing coil. The fact that the downward triangular shapes are arranged at equal intervals indicates that energizing coils are sequentially switched.

When an energizing coil is switched at a timing of a time $t_i$ shown in the drawing, an initial voltage command for a coil to be energized next is generated. An average speed used at that time can be calculated using data of a position of a specimen folder in a predetermined period.

Examples of the period include the following four periods.

The first period is a period A which is an energization time (from a time $t_{i-1}$ to the time $t_i$) of a coil energized before the energizing coil is switched at the time $t_1$, the second period is a period B in which a plurality of energizing coils are switched to be energized, the third period is a period C which is a part of a period in which a certain energizing coil is energized, and the fourth period is a period D including one switching timing. These periods may be, for example, about several milliseconds.

Figure 10:
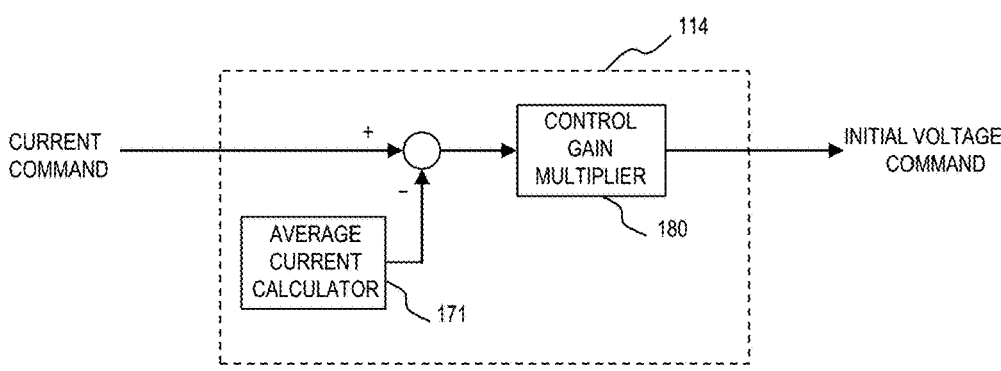
FIG. 10 is a block diagram showing another example of the initial voltage command generator shown in FIG. 3.

FIG. 10 is a configuration diagram showing another example of the initial voltage command generator shown in FIG. 3.

In FIG. 10, the initial voltage command generator 114 includes an average current calculator 171 (an average current calculation unit) and the control gain multiplier 180. That is, the average current calculator 171 is used instead of the average speed calculator 170 in the example shown in FIG. 8.

The average current calculator 171 calculates an average current. A difference between the calculated average current and a current command value from an upper controller (not shown), that is, an error is obtained.

The control gain multiplier 180 generates an initial voltage command using the obtained error. The configuration of the control gain multiplier 180 may be the same as that in the example shown in FIG. 8, such as a PI controller.

Figure 11:
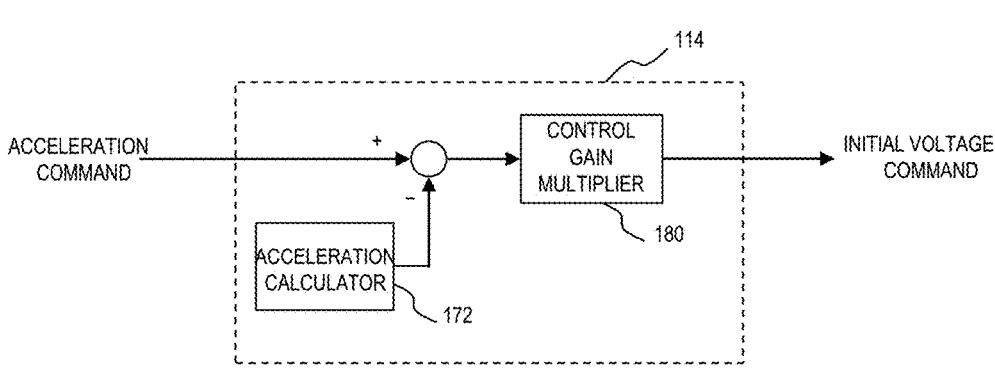
FIG. 11 is a block diagram showing another example of the initial voltage command generator shown in FIG. 3.

FIG. 11 is a configuration diagram showing another example of the initial voltage command generator shown in FIG. 3.

In FIG. 11, the initial voltage command generator 114 includes an acceleration calculator 172 (an acceleration calculation unit) and the control gain multiplier 180. That is, the acceleration calculator 172 is used instead of the average speed calculator 170 in the example shown in FIG. 8. Here, an average value in a predetermined period may be used as an acceleration.

The acceleration calculator 172 calculates an acceleration. A difference between the calculated acceleration and an acceleration command value from an upper controller (not shown), that is, an error is obtained.

The control gain multiplier 180 generates an initial voltage command using the obtained error. The configuration of the control gain multiplier 180 may be the same as that in the example shown in FIG. 8, such as a PI controller.

Although a case where average values of a speed, a current, and an acceleration are used is mainly described in the above examples, an initial voltage command may be generated using a maximum value, a minimum value, an effective value, or the like in a predetermined period other than an average value.

Figure 14:
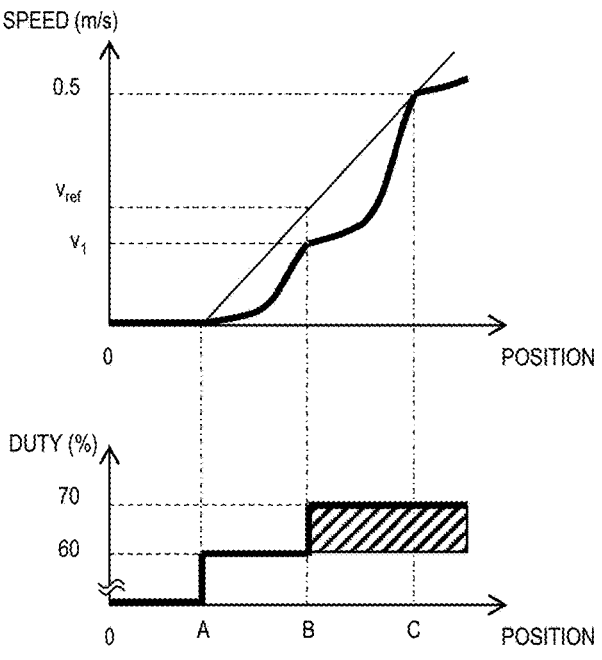
FIG. 14 is a graph showing an example of a speed of a specimen folder in an acceleration region and an output voltage.

FIG. 14 is a graph showing an example of a speed of a specimen folder in an acceleration region and an output voltage. A vertical axis of an upper graph represents a speed of the specimen folder, and indicates a process in which the specimen folder starts to move from a stopped state and accelerates. A vertical axis of a lower graph represents a duty width (equivalent to an output voltage) of a voltage pulse output from the coil drive unit 50. In both graphs, a horizontal axis represents a position of the specimen folder.

As shown on the horizontal axis, the specimen folder starts to move from a position A where the specimen folder is in a stopped state and accelerates via the positions B and C.

As shown in the lower graph, the duty is 60% between A and B and 70% between B and C.

In the example, a relationship between a slope of speed command values and a duty is known. A relational formula is stored as a database.

As shown in the drawing, when a voltage pulse having a duty of 60% is applied, a speed when the specimen folder passes through the position B is $V_{ref}$.

However, in practice, a friction coefficient may increase due to, for example, contamination or aging deterioration on the transport surface. In this case, when the duty is set according to a relational formula in the database, the speed when the specimen folder passes through the position B is a low value of Vi as shown in the drawing even when the thrust acting on the permanent magnet of the specimen folder is the same.

In such a case, the acceleration calculator 172 (FIG. 11) calculates a change in a speed between A and B, that is, an acceleration, and the control gain multiplier 180 amplifies a difference from an acceleration command to control the initial voltage command.

In FIG. 14, an increment of a duty indicated by an oblique line is an output from the initial voltage command generator 114. Since the duty of 60% set between A and B is not sufficient, the duty is increased by 10% between B and C to 70%.

It is preferable to perform control of updating an output from the initial voltage command generator 114 every time a coil to be energized is switched.

In the drawing, an energizing coil is set to be switched at the position B, the duty is changed at a switching timing, and the duty is constant at other positions.

A timing of changing the duty is not limited to this example, and the duty may be changed in a state where the same coil is energized. Further, control may be performed so as to maintain a desired speed by increasing a change frequency.

Although FIG. 14 shows an example in which a speed of the specimen folder 11 is lower than a set value (=a command value), the speed may exceed the set value. In this case, the output from the initial voltage command generator 114 is controlled to be lower than a predetermined duty.

Although only an acceleration region is described in the above example, the same control can be performed in a deceleration region.

In summary, when switching an energizing coil, the calculation unit 40 adjusts a width of a pulsed voltage based on a position of an object to be transported such as the specimen folder 11 during a predetermined period before switching a coil to be energized and a time at which the object to be transported passes through the position, so that a speed or an acceleration of the object to be transported is stabilized, and the calculation unit 40 outputs the width of the pulsed voltage to the coil drive unit. The calculation unit 40 may adjust the width of the pulsed voltage based on a current flowing through the energizing coil so that the speed or the acceleration of the object to be transported is stabilized, and output the width of pulsed voltage to the coil drive unit. Here, "the speed or the acceleration of the object to be transported is stabilized" refers to that the speed is as constant as possible in the constant speed region and the acceleration is as constant as possible in the acceleration region and the deceleration region.

Further, it is desirable that the speed or the acceleration of the object to be transported or the current flowing through the coil during the predetermined period before switching the energizing coil, which is used for determining the width of the pulsed voltage, is any one of a maximum value, a minimum value, an average value, and an effective value.

<Voltage Command Generator 111>

Figure 12:
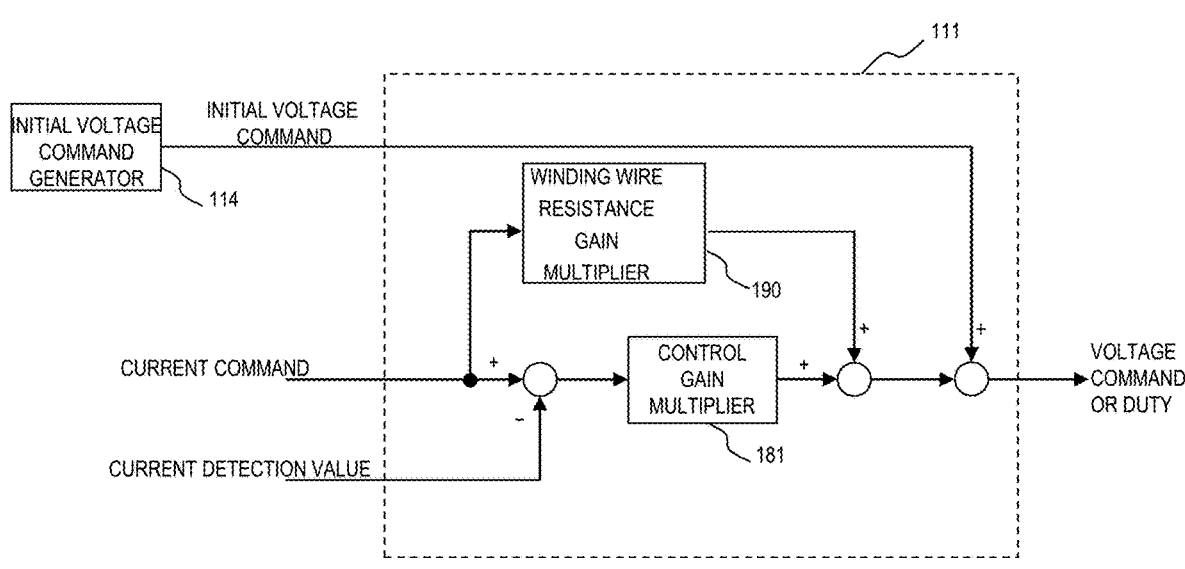
FIG. 12 is a configuration diagram showing an example of a voltage command generator shown in FIG. 3.

FIG. 12 is a configuration diagram showing an example of the voltage command generator shown in FIG. 3.

In FIG. 12, the voltage command generator 111 includes a control gain multiplier 181 and a winding wire resistance gain multiplier 190.

A difference between a current command value given from an upper controller (not shown) and a current detection value is input to the control gain multiplier 181.

On the other hand, the current command value is input to the winding wire resistance gain multiplier 190.

An output of the winding wire resistance gain multiplier 190 is added to an output of the control gain multiplier 181, a value is obtained by adding the outputs, and an initial voltage command which is an output of the initial voltage command generator 114 is further added to the value. A value obtained as a result is a voltage command that is an output of the voltage command generator 111. Here, the voltage command may be a duty.

In other words, in the example shown in the drawing, an initial voltage command value of the initial voltage command generator 114 is also added in addition to an element for obtaining a voltage drop in the coil 25 via the winding wire resistance gain multiplier 190 in a feedforward manner based on a current command value and an element for obtaining a difference between the current command value and a current detection value in a feedback manner.

The initial voltage command value of the initial voltage command generator 114 may be output only when an energizing coil is switched by using an energizing coil switching signal of the energizing coil switching determiner 113 as a trigger.

As described above, the transport device according to the present embodiment can be configured such that the width of the pulsed voltage applied to the coil at the time of switching the energizing coil is determined according to an average speed of the object to be transported or an average current flowing through the coil during a coil energization period before switching.

With such a configuration, when a position of the object to be transported is controlled by sequentially switching energizing coils, it is possible to prevent pulsation of a thrust that is structurally generated. Even when the number of objects to be transported at the same time increases, the objects to be transported can be stably transported.

Embodiment 2

In Embodiment 2, points different from Embodiment 1 will be described, and description of the same configuration and the like will be omitted.

Figure 13:
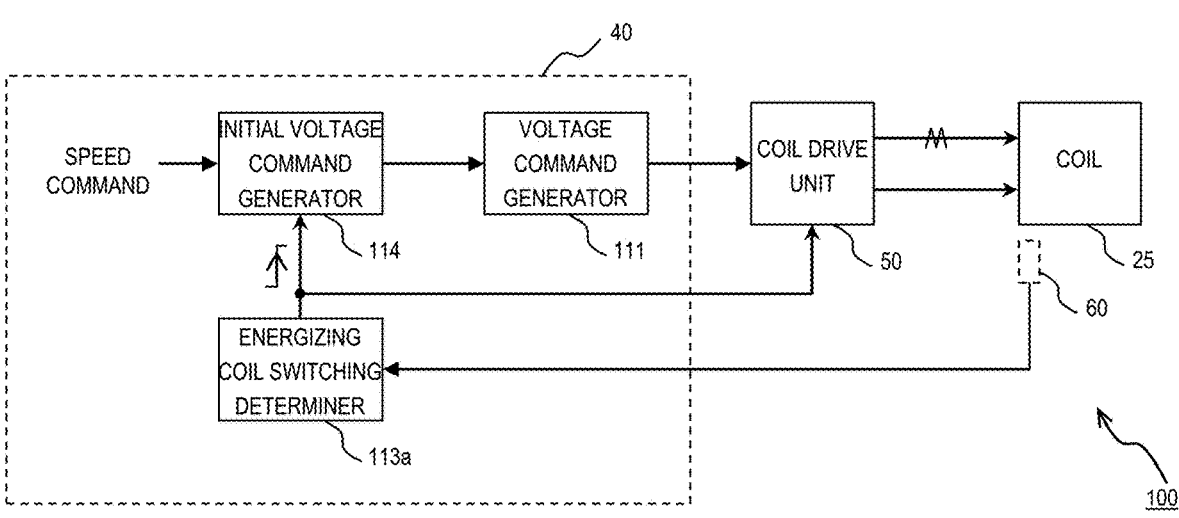
FIG. 13 is a functional block diagram showing a configuration of a transport device according to Embodiment 2.

FIG. 13 is a functional block diagram showing a configuration of a transport device according to Embodiment 2.

In the drawing, the transport device 100 includes the coil 25, the coil drive unit 50, and the calculation unit 40.

The calculation unit 40 includes the voltage command generator 111, an energizing coil switching determiner 113*a*, and the initial voltage command generator 114. A position detection unit 60 is provided near the coil 25.

In the drawing, the specimen position estimator 112 and the current detection unit 30 shown in FIG. 3 are not provided. The position detection unit 60 (a position detector) is provided instead of the current detection unit 30. The position detection unit 60 detects a position of the permanent magnet 10 provided in the specimen folder 11.

Examples of the position detection unit 60 include a Hall element and a linear encoder. The Hall element is a sensor that converts a magnetic field generated by a magnet or a current into an electric signal and outputs the electric signal, and is used as a position sensor that indirectly detects a position of a magnet. For example, according to a method in which when the permanent magnet 10 approaches the Hall element and a magnetic flux density exceeds a predetermined value, High is output, and when the magnetic flux density is less than the predetermined value, Low is output, it is possible to determine whether the permanent magnet 10 approaches the coil 25 in an energized state.

When the Hall element is used as the position detection unit 60, the energizing coil switching determiner 113*a* can use a High or Low signal based on the Hall element as an output of the estimated position comparator 160 (FIG. 6).

The transport device 100 can transport a plurality of specimen folders 11 at the same time, and contents of the present disclosure can be partially or entirely applied when the coil 25 to be energized for transporting the specimen folders 11 is switched. In addition, a plurality of upper controllers (not shown) in the present disclosure may be provided, and information on the initial voltage command may be exchanged between the upper controllers.

In summary, the determination of the width of the pulsed voltage in the calculation unit 40 is preferably based on a speed or an acceleration of the object to be transported in a predetermined period before switching an energizing coil, a current flowing through a coil, or a time when the object to be transported passes between two predetermined positions.

The present disclosure is not limited to the above-described embodiments, and includes various modifications. The present disclosure is not necessarily limited to those including all the configurations described above.

A part or all of configurations, functions, processing units, processing procedures, and the like described above may be implemented by hardware by, for example, designing with an integrated circuit. In addition, the configurations, functions, and the like described above may be implemented by software by a processor interpreting and executing a program for implementing each function.

REFERENCE SIGNS LIST

10: permanent magnet
11: specimen folder
12: transport surface
21: winding wire
22: core
25: coil
30: current detection unit
40: calculation unit
50: coil drive unit
55: power supply
60: position detection unit
100: transport device
111: voltage command generator
112: specimen position estimator
113: energizing coil switching determiner

114: initial voltage command generator
160: estimated position comparator
170: average speed calculator
171: average current calculator
172: acceleration calculator
180, 181: control gain multiplier
190: winding wire resistance gain multiplier

The invention claimed is:

1. A transport device that transports an object to be transported provided with a magnetic body, the transport device comprising:
a plurality of coils configured to generate a thrust for transporting the object to be transported; and
a processor configured to:
apply a pulsed voltage to each of the plurality of coils, and
when switching a coil to be energized, determine a width of the pulsed voltage such that a speed or an acceleration of the object to be transported is stabilized based on a position of the object to be transported and a time at which the object to be transported passes through the position or a current flowing through an energized coil in a predetermined period before switching the coil to be energized, and outputs the determined width.

2. A transport device that transports an object to be transported provided with a magnetic body, the transport device comprising:
a plurality of coils configured to generate a thrust for transporting the object to be transported; and
a processor configured to:
apply a pulsed voltage to each of the plurality of coils, and
when switching a coil to be energized, determine a width of the pulsed voltage such that a speed or an acceleration of the object to be transported is stabilized based on a position of the object to be transported and a time at which the object to be transported passes through the position or a current flowing through an energized coil in a predetermined period before switching the coil to be energized, and outputs the determined width,
wherein the width of the pulsed voltage is determined based on the speed or the acceleration of the object to be transported, the current flowing through the coil, or a time for the object to be transported to pass between two predetermined positions during the predetermined period before switching the coil to be energized.

3. A transport device that transports an object to be transported provided with a magnetic body, the transport device comprising:
a plurality of coils configured to generate a thrust for transporting the object to be transported;
a transport surface; and
a processor configured to:
apply a pulsed voltage to each of the plurality of coils,
when switching a coil to be energized, determine a width of the pulsed voltage such that a speed or an acceleration of the object to be transported is stabilized based on a position of the object to be transported and a time at which the object to be transported passes through the position or a current flowing through an energized coil in a predetermined period before switching the coil to be energized, and outputs the determined width, and
store data of a time change rate of the current or inductance of the coil on the transport surface, the data being determined based on a positional relationship between the magnetic body and the coil, and estimates the position of the object to be transported using a measured value of the current flowing through the coil.

4. The transport device of claim 2, wherein the speed or the acceleration of the object to be transported or the current flowing through the coil during the predetermined period before switching the coil to be energized, which is used for determining the width of the pulsed voltage, is any one of a maximum value, a minimum value, an average value, and an effective value.

\* \* \* \* \*